United States Patent [19]
Saxby

[11] Patent Number: 6,056,981
[45] Date of Patent: *May 2, 2000

[54] EUPHAUSIID HARVESTING AND PROCESSING METHOD AND APPARATUS

[75] Inventor: David John Saxby, West Vancouver, Canada

[73] Assignee: Biozyme Systems Inc., Vancouver, Canada

[*] Notice: This patent is subject to a terminal disclaimer.

[21] Appl. No.: 08/202,593

[22] Filed: Feb. 28, 1994

[51] Int. Cl.⁷ .................................. A23J 1/04; A23K 1/10
[52] U.S. Cl. ............................. 426/55; 426/63; 426/471; 426/520; 426/643
[58] Field of Search ................................ 426/55, 63, 643, 426/384, 465, 471, 520, 805

[56] References Cited

U.S. PATENT DOCUMENTS

| | | |
|---|---|---|
| 2,631,835 | 3/1953 | Jones . |
| 3,595,540 | 7/1971 | Whitcombe . |
| 3,662,474 | 5/1972 | Huthwaite . |
| 3,768,552 | 10/1973 | Ciraud . |
| 3,775,041 | 11/1973 | Buttner . |
| 3,859,734 | 1/1975 | Wahlgren . |
| 3,890,566 | 6/1975 | Nordblad et al. . |
| 4,041,181 | 8/1977 | Burrows et al. . |
| 4,347,670 | 9/1982 | Wear et al. . |
| 4,853,242 | 8/1989 | Poeppinghausen ............... 426/805 |
| 5,215,767 | 6/1993 | Mitsuhashi .............................. 426/520 |

FOREIGN PATENT DOCUMENTS

| | | |
|---|---|---|
| 1313835 | 2/1993 | Canada . |
| 05030923 | 2/1993 | Japan . |
| XP002070859 | 1/1983 | United Kingdom . |
| XP002070860 | 12/1991 | United Kingdom . |
| PCT/DK82/0008 | 8/1982 | WIPO . |
| WO 89/01031 | 2/1989 | WIPO . |
| WO 89/10960 | 11/1989 | WIPO . |
| WO 90/05026 | 5/1990 | WIPO . |

OTHER PUBLICATIONS

Webster's II New Riverside Dictionary, Houghton Mifflin Co. (1984), p. 430.

Paper entitled "A New Process for the Utilization of Antarctic Krill" by T. Ellingsen and V. Mohr, 1978.

"Autolysis Of Antarctic Krill Protein And Its Inactivation By Combined Effects Of Temperature and pH*" by M. Kubota and K. Sakai, Transactions of the Tokyo University of Fisheries, No. 2, pp. 53–63, Mar. 1978.

Primary Examiner—Daniel Stemmer
Attorney, Agent, or Firm—John Russell Uren

[57] ABSTRACT

Method and apparatus for harvesting and processing zooplankton and, in particular, for harvesting and processing euphausiids for subsequent use as a feed product for early stage juvenile or larvae feed or for a food product as an additive. The euphausiids are continuously harvested from coastal waters and dewatered. The dewatered product is passed to a heat exchanger to increase its temperature and, hence, to a digester where a desired level of enzymatic activity is obtained. The product is then held by a surge tank for subsequent transfer to a ball dryer where the product is dried at a relatively low temperature without destroying the stabilized enzymes created in the digester. The digesting step may be deleted in the event the end use of the product is for a food product.

15 Claims, 6 Drawing Sheets

EUPHAUSIID HARVESTING AND PROCESSING METHOD AND APPARATUS

INTRODUCTION

This invention relates to a method and apparatus for harvesting and processing zooplankton and, more particularly, to a method and apparatus for harvesting and processing euphausiids into a food product for human consumption such as for a carotenoid food product and/or into a feed product for animal consumption including early stage aquaculture.

BACKGROUND OF THE INVENTION

With the advent of increasing activity in aquaculture or fish farming in the early to mid-1980s, research has been ongoing into increasing productivity or growth rate and reducing the mortality rate of fish raised in aquaculture conditions since survival of such fish is important. One such factor relates to enhancing the nutritional value or palatability of feed used in raising such fish. In addition to the nutritional value, it is desirable to reduce the cost of feed to such fish since, typically, the feed totals approximately 40 to 50% of the cost of raising the fish. Such feed should be a high quality feed to meet the objectives of having high nutritional value and to reduce fish mortality.

The requirement for feed product in aquaculture is projected to grow substantially and, as a result, there is and will be pressure to obtain the necessary ingredients for fish food. The possibility of using zooplankton and, in particular, euphausiids, as a fish feed, appetizer or food product has been investigated and has been found to be possible and desirable, particularly as a feed product. Euphausiids are a natural feed harvested directly from coastal waters and have a high nutritional value but, previously, the cost of harvesting and processing such zooplankton for a feed product has been prohibitively expensive.

As well, the questions of the availability of the biomass of such zooplankton, storage of the zooplankton and its harvesting and processing are parameters that must be investigated in order to determine whether the product would be appropriate as a feed product.

Through papers written by Fulton and others, the use of zooplankton as a food or feed product has been contemplated for some time. In particular, antarctic krill (*Eunhausia superba*) for human consumption have been investigated, although relatively little work has been investigated related to aquaculture. The use of *Eunhausia pacifica* in the coastal waters of British Columbia, Canada has been considered in relation to aquaculture only.

It appears, from those investigations, that the necessary biomass is available in coastal waters. Previously, euphausiids have been used as a pet food ingredient and some aquaculture operators have used euphausiids as a feed product. The euphausiids were used for such purposes in a frozen form after being harvested and in some cases, the euphausiids were freeze dried following harvesting. This is an expensive procedure.

Harvesting euphausiids from coastal waters was previously done utilizing a mid-water trawl. When the trawl net was full of euphausiids, the trawl net would be raised and the euphausiids would be stored on a shipboard location for subsequent freezing. In utilizing the mid-water trawl net, however, severe damage was caused to the euphausiids by being bunched in the cod end of the net. The euphausiids would end up being squashed and leaching action would occur when the net was raised which is believed to reduce the nutritional value of the euphausiids. To reduce this damage, only a certain weight of euphausiids were subsequently taken in each operation when raising the net in an attempt to reduce the handling damage. Nevertheless, a certain degree of damage still occurred and, of course, the time required to raise the net is a disadvantage because of the reduction of fishing time.

In processing feed products, it has typically been the case that the ingredients used in such feed products are heated to a high temperature around 100° C. when the product is processed and dried. By heating the product to such a high temperature, it is believed that the enzymes and other proteins in the product are denatured. If, however, it is intended to utilize the product for early stage or juvenile aquaculture, which young fish have relatively undeveloped digestive systems, it is believed to be desirable that the euphausiids maintain a certain proportion of enzymes which will assist the digestive process in such larvae. If the theory that enzymes are advantageous in nutrition is correct, such destruction of the enzymes during the aforementioned drying process is disadvantageous.

It is also contemplated that it is desirable to have a natural product, where the proteins are not denatured, available for early stage juvenile or larvae feed. In some previous products, exogenous enzymes have been added to the zooplankton mix. However, the addition of such enzymes is difficult to control and can result in a complete hydrolysis of the proteins to amino acids. The presence of free amino acids interferes with digestion and creates an inferior product of substantially reduced value for a feed product.

It has been shown, surprisingly, that the degree of enzyme activity which results in determining the digestibility of a product, reaches a relatively constant value after a certain period of time in a natural product. Recent investigations conducted by the applicant have confirmed this characteristic for *Euphausia Pacifica*. This characteristic was first discovered in relation to *Euphausia superba* by Kubota and Sakai in a report entitled "Autolysis of Antarctic Krill Protein and Its Inactivation by Combined Effects of Temperature and pH", *Transactions of the Tokyo University of Fisheries*, number 2, page 53–63, March 1978. However, the antarctic krill study done by Messrs. Kubota and Sakai had the objective of limiting enzyme activity which was deleterious to obtaining a food as opposed to a feed product. Messrs. Kubota and Sakai wished to inhibit the enzymatic activity by certain processing techniques which they considered desirable when the product was intended as a food product.

When a degree of stabilization in enzymatic activity has been obtained during the digestive process in the euphausiids, further processing may take place in order to make a useful product for commercial feed. Such processes may include adding acid to obtain an acid stabilized product or drying the product using a variety of drying techniques such as freeze drying, spray drying, or vacuum and air drying. Spray drying, as well as other drying processes, however, are done at temperatures that will permanently inactivate the enzymes in the euphausiids which, as earlier mentioned, is considered to be undesirable for aquaculture purposes although it is acceptable for purposes where the product is intended as an additive for a food product such as a carotenoid which may be used as a biopigment for coloring purposes in both feed and food products.

SUMMARY OF THE INVENTION

According to one aspect of the invention there is provided a method of harvesting zooplankton comprising towing a trawl net behind a vessel in coastal waters through a location of zooplankton, said net having an open forward end and a rearward cod end, means to maintain said open end of said net at a predetermined depth below the surface of said coastal waters where said zooplankton are located, a cage positioned in said cod end of said net to maintain said cod end in an open condition and a pump to continuously remove said zooplankton from said cod end of said net and to move said zooplankton to a shipboard location.

According to a further aspect of the invention, there is provided apparatus for harvesting zooplankton from coastal waters comprising a trawl net having an open end and a rearward cod end, means to pull said trawl net behind a towing vessel, means to maintain said open end of said trawl net at a predetermined depth below the surface of said coastal waters, means to maintain said cod end of said net in an open condition and means to pump said zooplankton from said cod end of said net to a shipboard location.

According to yet a further aspect of the invention, there is provided a method of producing a feed product comprising heating a quantity of zooplankton to a predetermined temperature less than 70° C., maintaining said temperature for a predetermined time period uniformly throughout said quantity of zooplankton, removing said zooplankton after said predetermined time period at said predetermined temperature and storing said zooplankton.

According to yet a further aspect of the invention, there is provided a method of producing a feed product comprising a method of producing a feed product comprising drying a quantity of harvested zooplankton by passing said zooplankton through a dryer, said dryer having a plurality of moveable balls intended to contact said zooplankton at a temperature which is elevated by passing a volume of preheated air through said balls and said zooplankton at a predetermined temperature and volume for a predetermined time period.

According to yet a further aspect of the invention, there is provided apparatus to obtain a feed product from zooplankton comprising means to hold a quantity of said zooplankton, means to raise the temperature of said holding means to a predetermined value, means to distribute said predetermined temperature throughout said quantity of zooplankton, means to maintain said predetermined temperature for a predetermined time in said zooplankton and means to remove said quantity of zooplankton from said holding means after said predetermined time at said predetermined temperature.

According to a further aspect of the invention, there is provided a method of producing a feed product comprising drying a quantity of harvested zooplankton by passing said zooplankton through a dryer, said dryer having a plurality of movable balls intended to contact said zooplankton at an elevated temperature which is maintained by passing a volume of preheated air through said balls and a volume of zooplankton for a predetermined time period.

According to yet a further aspect of the invention, there is provided drying apparatus for drying zooplankton comprising means to introduce said zooplankton to a dryer container, means to introduce a predetermined flow of heated air to said dryer container thereby to heat a plurality of balls movable within said container to a predetermined temperature and bringing said zooplankton into contact with said heated balls for a predetermined time period.

According to yet a further aspect of the invention, there is provided a method for producing a feed product or additive comprising the steps of subjecting a quantity of zooplankton to a predetermined temperature for a predetermined time period in order to maintain enzymatic activity of said zooplankton enzymes to effect partial autolysis of said zooplankton and thereafter suspending said enzymatic activity by drying said zooplankton at a temperature less than 70° C. to preserve the plankton enzyme in said zooplankton.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1A:
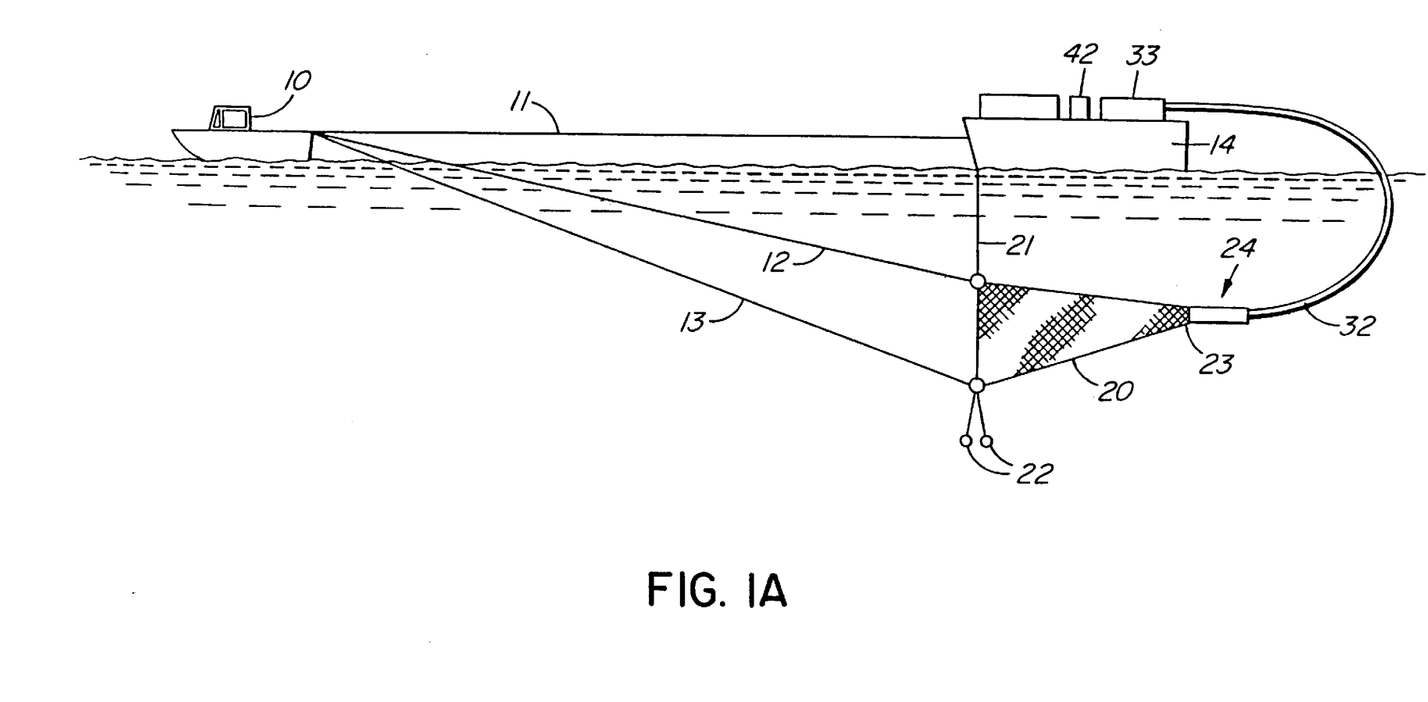
FIG. 1A is a diagrammatic isometric view of a fishing vessel with an attached net which utilizes the euphausiid harvesting technique according to the invention.

Referring now to the drawings, a towing vessel 10 is illustrated in FIG. 1. A plurality of towing ropes 11, 12, 13 are connected to the towing vessel 10 in order to tow a barge 14 and a net 20. A plurality of ropes 21 (only one of which is shown) are connected to the net 20 and extend downwardly from the barge 14. Weights 22 are connected to the bottom of the open forward facing portion of the net 20 in order to maintain the net 20 at a desired and predetermined depth where the concentration of zooplankton is satisfactory.

Figure 2A:
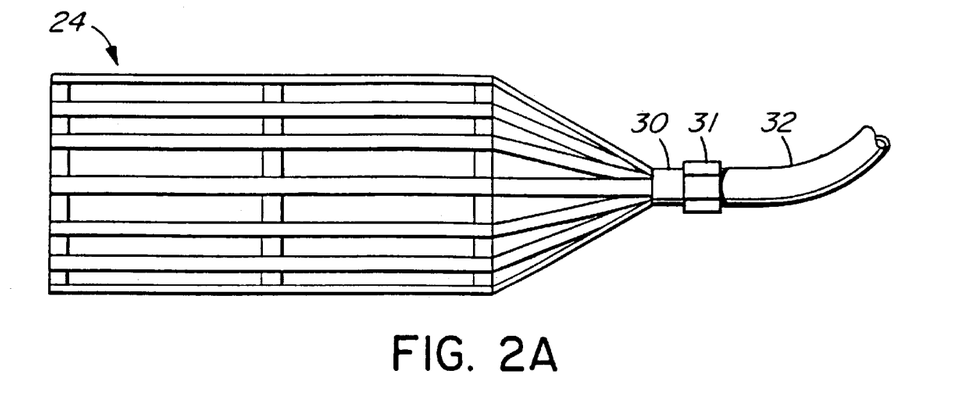
FIG. 2A is a diagrammatic side view of a cage which is used to maintain the cod end of the fishing net illustrated in FIG. 1 in an open position and which is further used to transport the harvested euphausiids to the harvesting vessel.

The cod or rearward end 23 of the net 20 is maintained in an open condition by the use of a cage generally illustrated at 24 in FIG. 2. Cage 24 is of cylindrical configuration and is positioned within the cod end of net 20. It is made from aluminum and is preferably corrosion resistant. A fitting 30 is welded to the downstream end of the cage 24 and one end of a swivel connection 31 is joined to the fitting 30 to prevent fouling the net in the event components become unstable under adverse harvesting conditions. A hose 32 is connected to the other end of the connection 31.

Figure 2B:
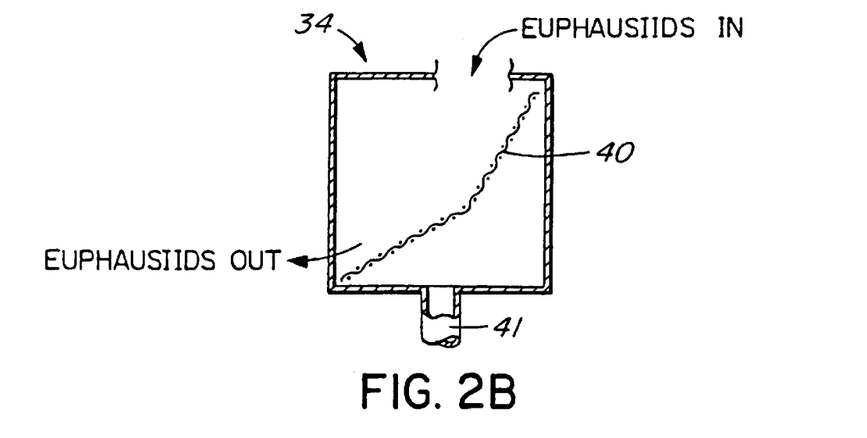
FIGS. 2B and 2C are side and rear views, respectively, of the dewatering trough used to remove water from the harvested euphausiids.
Figure 2C:
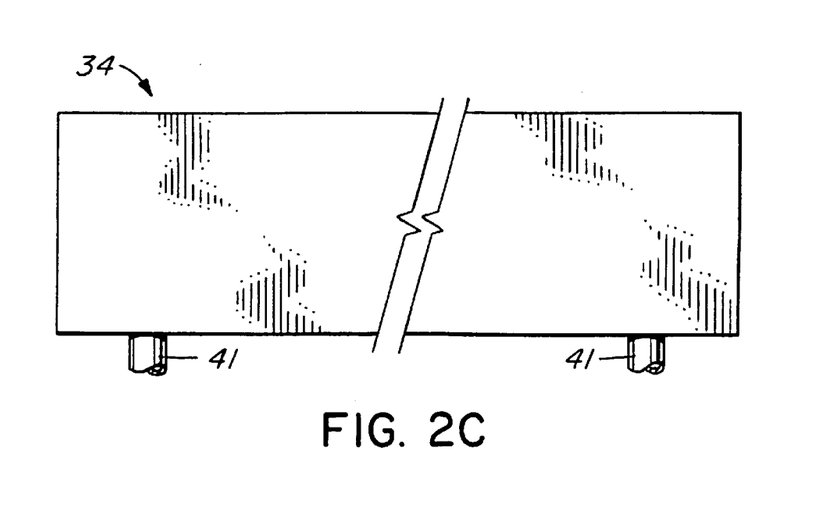

Referring again to FIG. 1, hose 32 extends upwardly from the cod end of the net 20 to the barge 14. A pump of a variety of configurations but, conveniently, a diaphragm sump pump 33, is located at the other end of the hose 32 on barge 14. A dewatering trough is generally shown at 34 and is illustrated in FIGS. 2B and 2C. Dewatering trough 34 has a lengthwise generally rectangular configuration and is also located on barge 14. Dewatering trough conveniently takes the configuration of a "lazy L". A set of screens 40 positioned at obtuse angles are utilised to allow water to drain from the pumped euphausiids and exit the trough 34 through drain pipes 41 while the euphausiids accumulate within the dewatering trough 34.

A blast freezer 42 was also located on the barge 14 to stabilize the harvested euphausiids. The blast freezer 42 subjects the euphausiids to a temperature of approximately +9° to −17° C. and is used to freeze the dewatered euphausiids and stabilize the product for further processing. The euphausiids accumulate within the dewatering trough 34 and which are periodically removed from the trough 34 from time to time for freezing. Thereafter, the frozen euphausiids are transported to a processing location and processed as described hereafter.

In prototype demonstrations, the net 20 utilised for the harvesting operation was a specially designed 13 ft. by 21 ft. plankton net suspended from a 46 ft. aluminum barge. The pumping action was by a three inch diaphragm pump located on the barge 14 and the freezing action occurred within a minus seventeen (17) degree centigrade blast freezer 42.

Figure 3:
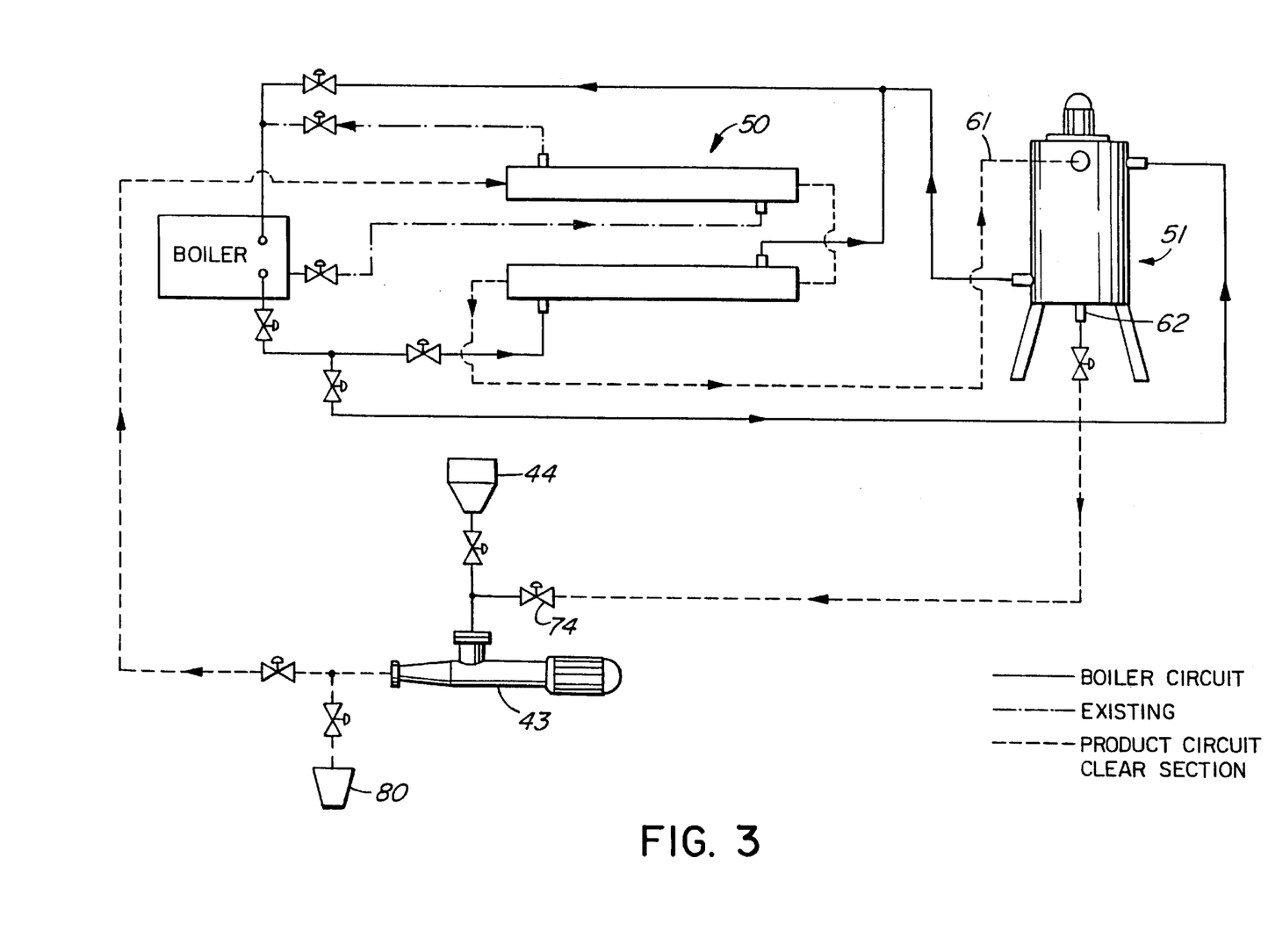
FIG. 3 is a diagrammatic process chart illustrating the processing of the euphausiids subsequent to the dewatering steps illustrated in FIG. 2 and prior to the drying step.

As earlier described, the frozen euphausiids are transported to a processing location in order to transform the euphausiids into the desired feed product. Reference is now made to the flow chart of FIG. 3.

A pump 43 is connected to a hopper 44 which receives the euphausiids which are now in a thawed condition. Pump 43 is connected to a heat exchanger generally illustrated at 50 and diagrammatically illustrated in FIG. 3. The heat exchanger 50 is intended to raise the temperature of the euphausiids to a temperature of approximately 40° C. to 60° C. which will more closely approximate the temperature maintained in the digester which is generally lower than 70° C. and which digester is generally illustrated at 51. Digester 51 is located downstream of the heat exchanger 50 in the process illustrated in FIG. 3.

Figure 4A:
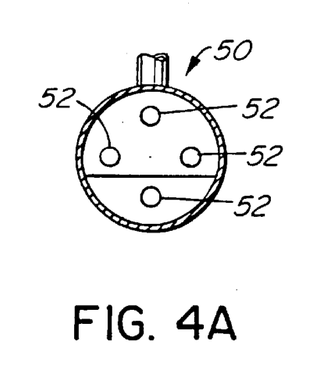
FIGS. 4A and 4B are end and side sectional views of the heat exchanger used to raise the temperature of the harvested euphausiids prior to the digester process.
Figure 4B:
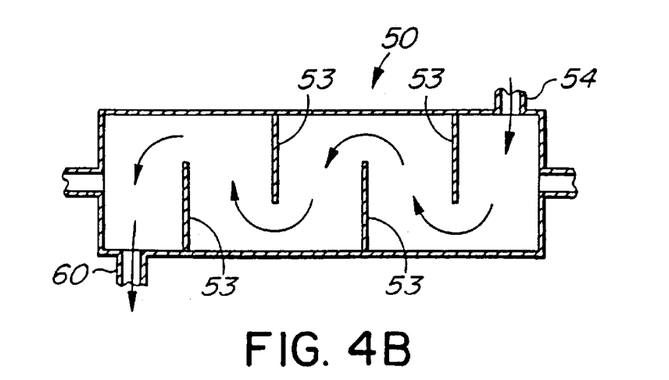

Although several different types of heat exchangers may be used, heat exchanger 50 conveniently comprises a plurality of pipes 52 (FIG. 4A) in which the euphausiids are conveyed through the heat exchanger. Heated water enters the inlet 54 of the heat exchanger 50 and is circulated through the heat exchanger 50 generally following the flow path seen in FIG. 4B which utilizes a plurality of baffles 53. The heated water exits the heat exchanger at outlet 61. Following the increase of temperature created in the euphausiids by the heat exchanger 50, the euphausiids pass to the digester 51.

Figure 5:
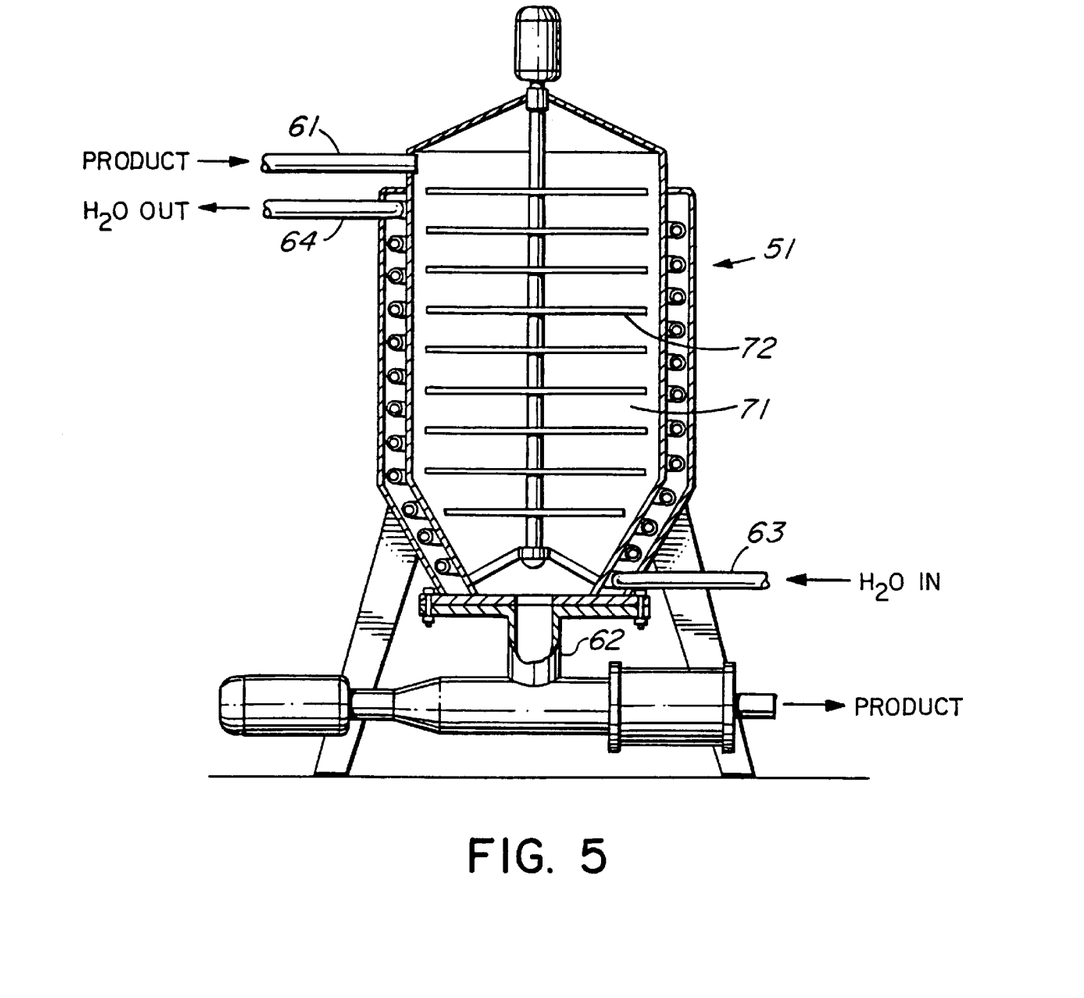
FIG. 5 is a diagrammatic side sectional view of the digester used to create the desired enzyme level within the euphausiids.

Digester 51 is seen is greater detail in FIG. 5. It comprises a product inlet 61 and a product outlet 62. A water inlet 63 and a water outlet 64 are provided. A water jacket 70 through which the heated water circulates surrounds the cylindrical cavity area 71 of the digester 51 which contains the euphausiids. A plurality of stirring discs 72 are located vertically within the cavity area 71 of the digester 51 and are used to stir the euphausiids when they are positioned within the digester 51. A valve 73 is used to close the product outlet 62 so as to maintain the euphausiids within the digester 51 until the proper temperature and time for the desired enzyme formation within the euphausiids has taken place. The time period has conveniently extended between thirty (30) minutes and two (2) hours.

Although it is presently thought that a degree of digestibility will enhance the feed product only for certain fish such as early stage larvae or juveniles, it is contemplated by the applicant that such digestibility may enhance the feed product for virtually all fish. In utilising the digester 51 illustrated in FIG. 5, a batch process is currently being used with a volume of euphausiids of 250 lb./hr being used.

The valve 62 is then opened and the quantity of euphausiids within the digester 51 pass through the valve 62 and are transported through valve 74 to the surge tank or heated batch storage vessel 80 where they await treatment in the dryer, conveniently a ball dryer generally illustrated at 81 (FIG. 6) where relatively low and controlled temperatures can be applied to the euphausiids such that the enzymatic activity within the euphausiids is suspended and any enzymes existing within the euphausiids are not inactivated as would otherwise be the case in a normal drying process and are preserved.

Figure 6:
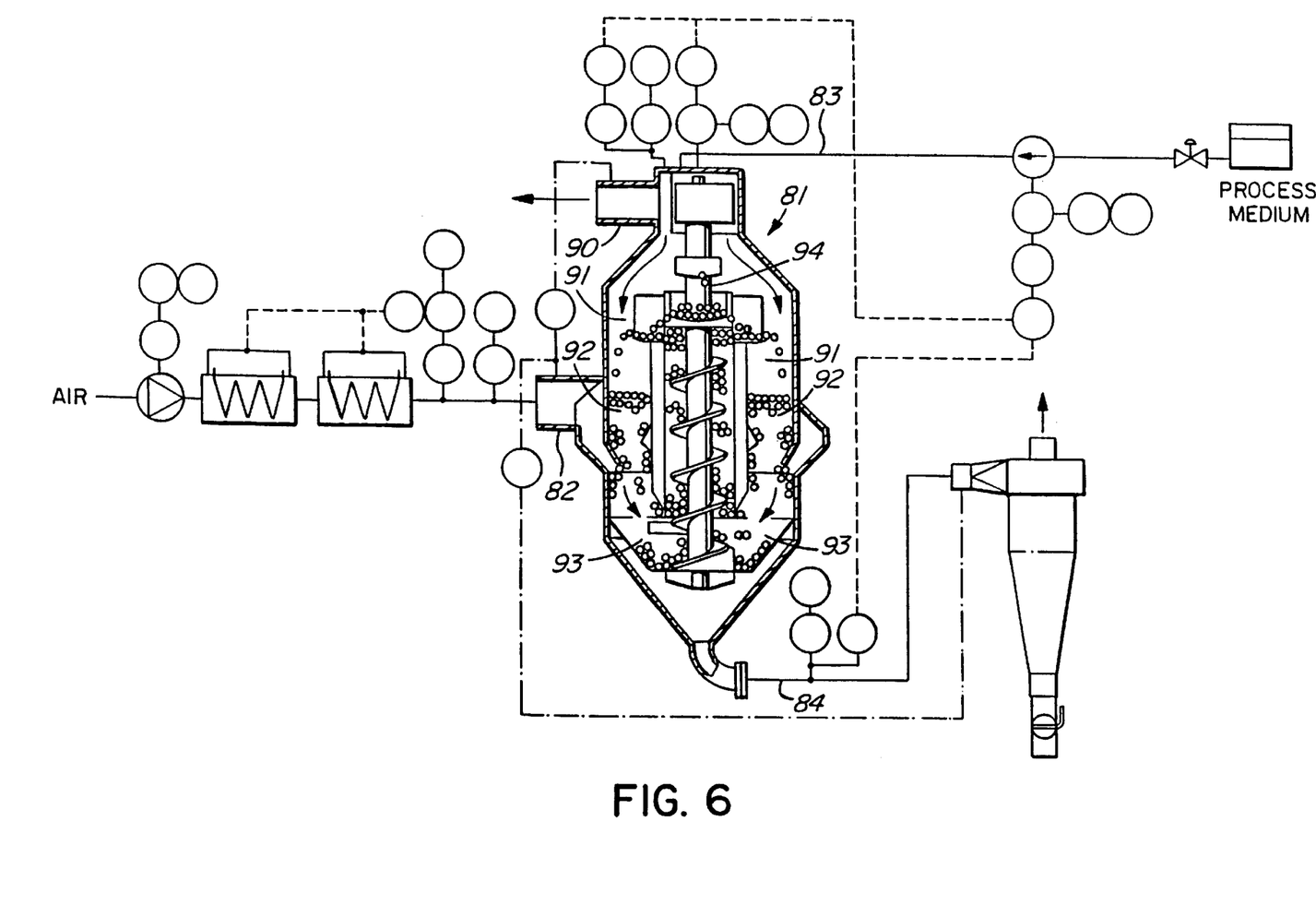
FIG. 6 is a diagrammatic side sectional view of a ball drier used to dry the euphausiids following removal of the euphausiids from the surge tank located downstream from the digester.

The euphausiids pass from the storage vessel 80 to the ball dryer 81 through product inlet 83 and, thence, about the periphery of the dryer 81 initially through the application zones 91 where the balls initially contact the euphausiids and begin the drying process. The ball dryer 81 performs a "soft" drying process which reduces damage to the euphausiids because of its gentle action. The ball drying process utilises a continuous feed into the ball dryer 81 and a product flow of 15 lb./hr. is available.

As the balls and euphausiids move downwardly through the drying zones 92, they meet a counter-current flow of controlled-temperature drying air at less than 50° C. which air enters the ball dryer 81 through air inlet 82. Air flow, temperature and dwell time are precisely controlled and monitored within this zone. All of these are variable factors which depend upon whether the product is wet or dryer and what period of time the product is intended to stay in the dryer 81.

In the separation zone 93 at the bottom of the dryer 81, the ball and euphausiids meet a co-current flow of controlled temperature air for final drying and separation. The dried euphausiids leave the ball dryer 81 through the product outlet 84 and pass to the packaging step. The drying balls are elevated by rotating helix 94 and recycled to the application zone 91 and the process continues.

While one of many commercial ball dryers may be used for the air drying of the euphausiids, an ECAL Pilot Drier Type 25F has been found satisfactory for the prototype purposes outlined in this application. This ball drier is produced by ECAL PDS America, Inc. of Princeton, N.Y.

It is contemplated that although the processing of the euphausiids has been described as taking place at a land location, such processing steps may take place at the harvesting location on board either the harvesting vessel or another vessel conveniently located nearby. This results in advantages in that the euphausiids need not be frozen following harvesting and need not be transported to a land based processing plant thereby resulting in considerable cost savings and quality improvement. In addition, the euphausiids may be introduced directly to the ball dryer 81 following harvesting. The dried euphausiids, after being subjected to the digester and/or the drying processes, may then be stored on the vessel until a substantial quantity have been obtained at which time they may be transferred to another vessel for transport to the processing vessel itself which, when full, will transport the euphausiids to the shore.

Likewise and while it is desirable for the digester and drying steps to take place concurrently and sequentially in the event the euphausiids are intended to be used as a feed product for juvenile and early stage larvae, it is further contemplated that the euphausiids may be dried directly following harvesting in the event the digester step is not required as would be the case, for example, if the harvested euphausiids are intended to be used as a food product such as for use as an additive or as an animal feed where pre-digestion is not required such as, for example, when use as a cat food, for example, or as an appetizer is contemplated.

Figure 1B:
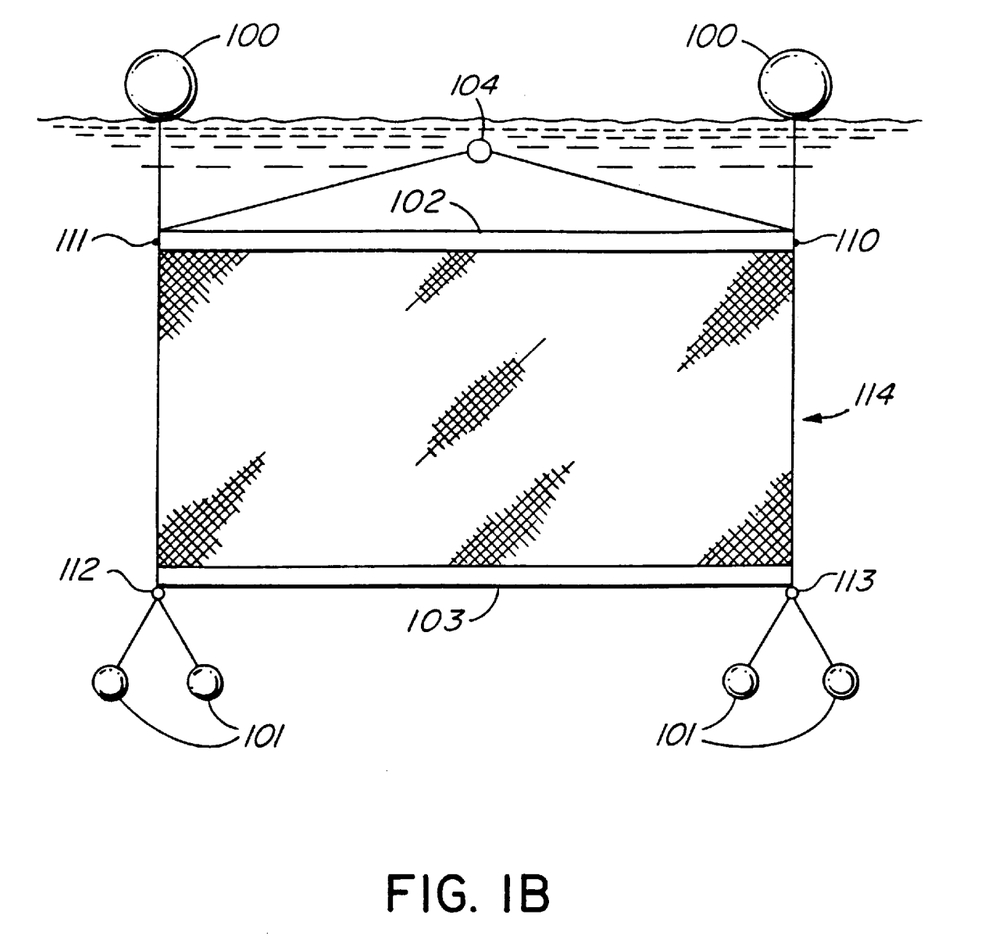
FIG. 1B is a diagrammatic front view of a net in an alternative harvesting technique according to the invention.

A further harvesting technique is contemplated in FIG. 1B. In this technique, weights 101 are connected to the mouth end of the net generally illustrated at 114 at the ends of the lower horizontal beam 103. Floats 100 are connected to the top horizontal beam 102 of the mouth end of the net 114. Depending on the size of the net 114, lines are connected on one end to attachment points 104, in the first instance or, alternatively, to points 110, 111, 112, 113 and, on the other end, to the towing vessel. The net 114 is pulled through the water gathering the zooplankton which enter the net 114 through the mouth.

While specific embodiments of the invention have been described, such description should be taken as illustrative of the invention only and not as limiting its scope as defined in accordance with the accompanying claims.

I claim:

1. A method of producing a feed product or feed additive comprising heating a quantity of zooplankton to a predetermined temperature, maintaining said temperature for a predetermined time period uniformly throughout said quantity of zooplankton to maintain enzymatic activity of the zooplankton enzymes, removing a least a portion of said zooplankton after said predetermined time period at said predetermined temperature, suspending said enzymatic activity by drying said removed zooplankton at a temperature less than 70 degrees Celsius to preserve said enzymes in said zooplankton, and storing said removed zooplankton.

2. A method as in claim 1 wherein said predetermined temperature is less than 60° C. and greater than 35° C.

3. A method as in claim 1 wherein said predetermined time period is from thirty (30) minutes to two (2) hours.

4. A method as in claim 3 wherein said time period is approximately sixty (60) minutes.

5. A method as in claim 2 wherein said storing comprises freezing said removed zooplankton.

6. A method as in claim 2 wherein said storing further comprises controlling the pH of said zooplankton.

7. A method as in claim 2 wherein said zooplankton comprise euphausiids.

8. A method as in claim 2 wherein said zooplankton is dried utilizing a ball dryer.

9. A method as in claim 6 wherein said pH is controlled between values of 4 to 7.

10. A method of producing a feed product or feed additive comprising the steps of heating a quantity of zooplankton to a predetermined temperature for a predetermined time period in order to maintain enzymatic activity in said zooplankton without the addition of exogenous enzymes, removing at least a portion of said zooplankton after said predetermined time period at said predetermined temperture, suspending said enzymatic activity by drying said removed zooplankton at room temperture less than 70 degrees Celsius and storing said removed zooplankton.

11. A method as in claim 10 wherein said predetermined time period is from thirty (30) minutes to two (2) hours.

12. A method of producing a feed product or additive comprising the steps of subjecting a quantity of zooplankton to a predetermined temperature for a predetermined time period in order to maintain enzymatic activity of said zooplankton so as to preserve the enzymes in said zooplankton and to effect partial autolysis of said zooplankton and thereafter suspending said enzymatic activity by drying said zooplankton at a temperature less than 70 degrees Celsius to preserve the zooplankton enzymes in said zooplankton.

13. A method as in claim 12 wherein said predetermined temperature is from 35° C. to 60° C.

14. A method as in claim 13 wherein said time period is from thirty (30) minutes to two (2) hours.

15. A method as in claim 14 wherein the pH of said zooplankton is maintained at a value of from 4 to 7.

* * * * *